United States Patent

[11] 3,522,844

| | | |
|---|---|---|
| [72] | Inventor: | Milton K. Abdo<br>Dallas, Texas |
| [21] | Application No.: | 783,370 |
| [22] | Filed: | Dec. 12, 1968 |
| [45] | Patented: | Aug. 4, 1970 |
| [73] | Assignee: | Mobil Oil Corporation<br>a Corp. of New York |

[54] OIL RECOVERY PROCESS WITH SELECTIVE PRECIPITATION OF POSITIVE NONSIMPLE LIQUID
5 Claims, 6 Drawing Figs.

[52] U.S. Cl. .................................................. 166/270,
166/273, 166/294
[51] Int. Cl. ................................................. E21b 33/138,
E21b 43/22
[50] Field of Search ........................................ 166/270,
273-275, 294, 300

[56] References Cited
UNITED STATES PATENTS

| 3,175,610 | 3/1965 | Osoba | 166/270 |
| 3,333,634 | 8/1967 | Townsend et al. | 166/273 |
| 3,372,478 | 3/1968 | Cook | 166/273X |

*Primary Examiner*— Stephen J. Novosad
*Assistant Examiner*— Ian A. Calvert
*Attorney*—William J. Scherback, Frederick E. Dumoulin, William D. Jackson, Andrew L. Gaboriault and Sidney A. Johnson

ABSTRACT: This specification discloses an oil recovery process involving the injection of a positive nonsimple aqueous liquid. The aqueous liquid contains a material which is reactive with divalent metal ions within the reservoir to form a plugging deposit within the reservoir. A chelating agent for such divalent metal ions also is injected into the reservoir. This agent functions to form complexes with the ions thus tending to prevent their entering into precipitate-forming reactions. Subsequent to the injection of the positive nonsimple liquid, an aqueous liquid containing a chelating agent is again injected into the reservoir. As the injected fluids move through the reservoir, the material contained in the positive nonsimple liquid is selectively precipitated from solution to form plugging deposits at zones of crossflow between adjacent strata of diverse permeabilities. An aqueous solution of an alkali metal salt may be injected into the reservoir prior to or concomitantly with the initial introduction of the chelating agent.

U.S. PATENT 3,522,844
OIL RECOVERY PROCESS WITH SELECTIVE
PRECIPITATION OF POSITIVE NONSIMPLE LIQUID

BACKGROUND OF THE INVENTION

Field of the Invention

This invention relates to the recovery of oil from subterranean oil reservoirs and, more particularly, to new and improved secondary recovery operations utilizing positive nonsimple liquids.

In the recovery of oil from oil-bearing reservoirs, it usually is possible to recover only a minor portion of the original oil in place by the so-called primary recovery methods which utilize only the natural forces present in the reservoir. Thus, a variety of supplemental recovery techniques have been employed in order to increase the recovery of oil from subterranean reservoirs. In these supplemental techniques, which are commonly referred to as secondary recovery operations although in fact they may be primary or tertiary in sequence of employment, fluid is introduced into the reservoir in order to displace the oil therein to a suitable production system through which the oil may be withdrawn to the surface of the earth. The displacing medium may be a gas, an aqueous liquid such as fresh water or brine, and oil-miscible liquid such as butane, or a water and oil-miscible liquid such as an alcohol. Generally, the most promising of the secondary recovery techniques involves the injection into the reservoir of an aqueous flooding medium, either alone or in combination with other fluids.

One difficulty which often is encountered in secondary recovery operations is the relatively poor sweep efficiency of the injected displacing liquid. That is, the displacing liquid exhibits a tendency to channel through certain portions of the reservoir and to bypass other portions. Such poor sweep efficiency is occasioned by differences between the viscosity of the injected displacing medium and the in-situ reservoir oil and also by permeability variations within the reservoir. The reservoir may comprise a plurality of fairly well defined zones of widely diverse permeabilities. The injected displacing fluid preferentially flows through the more permeable zones of the reservoir thus leading to premature breakthrough of the displacing fluid at the production well or wells.

Various techniques have been proposed in order to improve the sweep efficiency of the injected displacing fluid and thus avoid premature breakthrough. For example, it has been proposed to selectively inject plugging agents into the more permeable zones of the reservoir in order to effect an overall decrease in permeability variation. Another technique for increasing sweep efficiency involves the utilization of a relatively viscous displacing liquid. Thus, in waterflooding operations, for example, thickening agents have been added to at least a portion of the flood water in order to increase the viscosity thereof. The viscosity of the displacing liquid may be increased prior to its injection into the reservoir. Alternatively, the viscosity of the liquid displacing medium may be increased in situ, in order to avoid a reduction in injectivity at the injection wells. For example, in U.S. Patent No. 3,208,518 to John T. Patton, there is disclosed a waterflooding process in which the viscosity of the aqueous displacing medium is increased in situ through the use of high molecular weight ionic polymers under controlled pH conditions. Another secondary recovery process in which the viscosity of the aqueous displacing liquid is increased in situ involves the injection of a shear-thinning liquid. Thus, as disclosed in U.S. Patent No. 3,292,696 to B. B. Sandiford, an aqueous solution of hydroxyethylcellulose, which exhibits a relatively low viscosity at high shear rates, may be injected into the reservoir in order to displace oil therefrom.

A recently developed secondary recovery technique of considerable promise involves the use of positive nonsimple liquids as displacing mediums. In this technique, as described in U.S. Patent No. 3,391,736 to M. K. Abdo, the positive nonsimple liquid exhibits an increase in viscosity within the reservoir with an increase in permeability such that the flow of the injected displacing liquid tends to become more even within zones of diverse permeabilities. As disclosed in this patent, various additives which may be utilized to impart positive nonsimplicity to the aqueous displacing liquid tend to precipitate upon contact with divalent metal ions such as calcium, magnesium, and iron which are normally found in subterranean formations. Suitable steps to prevent such precipitation are disclosed. Thus, chelating agents such as the sodium salt of ethylenediaminetetraacetic acid or sodium hexametaphosphate may be added to the positive nonsimple liquid. Alternatively, an aqueous solution of a chelating agent may be injected into the reservoir ahead of the positive nonsimple liquid.

SUMMARY OF THE INVENTION

In accordance with the present invention, there are provided new and improved methods of secondary oil recovery wherein crossflow of an injected, positive nonsimple liquid between zones of diverse permeabilities within the reservoir is restricted by selective precipitation of a plugging deposit from the positive nonsimple liquid. The invention is practiced in a subterranean oil reservoir which is penetrated by spaced injection and production systems defining a recovery zone of the reservoir. In carrying out the invention, an aqueous liquid containing a chelating agent for divalent metal ions within the reservoir is injected into the reservoir through the injection system. The chelating agent functions to form complexes with the divalent metal ions, thus tending to prevent their entering into precipitate-forming reactions. A positive nonsimple aqueous liquid is injected into the reservoir via the injection system. This liquid contains a material which is reactive with the aforementioned divalent metal ions to form a precipitate within the reservoir. Subsequent to injection of the positive nonsimple liquid an aqueous liquid containing a chelating agent is again injected into the reservoir. A driving fluid then is injected into the reservoir through the injection system and oil is recovered from the production system. As the aforementioned fluids are moved through the reservoir from the injection system to the production system, the material contained in the positive nonsimple liquid is selectively precipitated from solution to form plugging deposits at zones of crossflow between adjacent strata of diverse permeabilities. This tends to restrict the flow of positive nonsimple liquid to strata of relatively high permeabilities where the most beneficial effects are obtained.

In a preferred embodiment of the invention the chelating agent initially injected into the reservoir is injected in an aqueous liquid prior to the introduction of the positive nonsimple liquid. This aqueous liquid desirably is a Newtonian or shear-thinning liquid such that the initially injected chelating agent is preferentially displaced into zones of high permeability relative to the displacement of the positive nonsimple liquid. In yet a further aspect of the invention, an aqueous solution of an alkali metal salt is injected into the reservoir prior to or concomitantly with the initial introduction of chelating agent. By this technique an ion exchange reaction is effected between the alkali metal ions and divalent metal ions associated with clays within the reservoir. Thus, the divalent metal ions are placed in an aqueous solution for ultimate reaction to form the aformentioned plugging deposits within the reservoir.

DESCRIPTION OF SPECIFIC EMBODIMENTS

The present invention is carried out in a recovery zone of a subterranean oil-bearing reservoir. As will be understood by those skilled in the art, by the term "recovery zone", as used herein and in the appended claims, is meant that portion of a reservoir through which oil is displaced to the production system by the injected displacing medium. The injection and production systems each may comprise one or more wells extending from the surface of the earth into the subterranean oil reservoir and such wells may be located and spaced from one another in any desired pattern. For example, the so-called "line flood" pattern may be utilized, in which case the injection and production systems comprise rows of wells spaced from one another. In this type of pattern the recovery zone, as defined by the spaced rows of injection and production wells, generally will be that portion of the reservoir underlying the area between these spaced rows. Exemplary of other patterns which may be used are the so-called "circular flood" patterns in which the injection system comprises a central injection well and the production system comprises a plurality of production wells spaced about the injection well. Of course, the injection and production systems each may consist of only a single well in which case the recovery zone, as defined by the spaced injection and production wells, will be the portion of the reservoir underlying a generally elliptical area between these wells which is subject to the displacing action of the injected flooding medium. The above and other patterns are well known to those skilled in the art and for a more detailed description of such patterns, reference is made to Uren, L. C., PETROLEUM PRODUCTION ENGINEERING - OIL FIELD EXPLOITATION, 2nd Ed., McGraw-Hill Book company, Inc., New York and London, 1939, and more particularly to the section entitled "The Water Flooding Process", appearing at pages 444-459.

It also will be recognized that the invention may be carried out utilizing one or more dually completed injection-production wells of the type, for example, disclosed in U. S. Patent No. 2,725,106 to Ralph Spearow. This arrangement sometimes may be utilized to advantage in a relatively thick oil reservoir in which it may be desirable to displace the oil in the reservoir upwardly and recover such oil from the upper portion of the reservoir. In this instance, the injection system normally would comprise the lower completion interval of one or more dually completed wells of the type described in the aforementioned patent to Spearow and the production system would comprise the upper completion interval of one or more of such wells. In this case, of course, the recovery zone would be that portion of the reservoir subject to the displacing action of the flooding medium as it moves upwardly through the reservoir.

Figure 1:
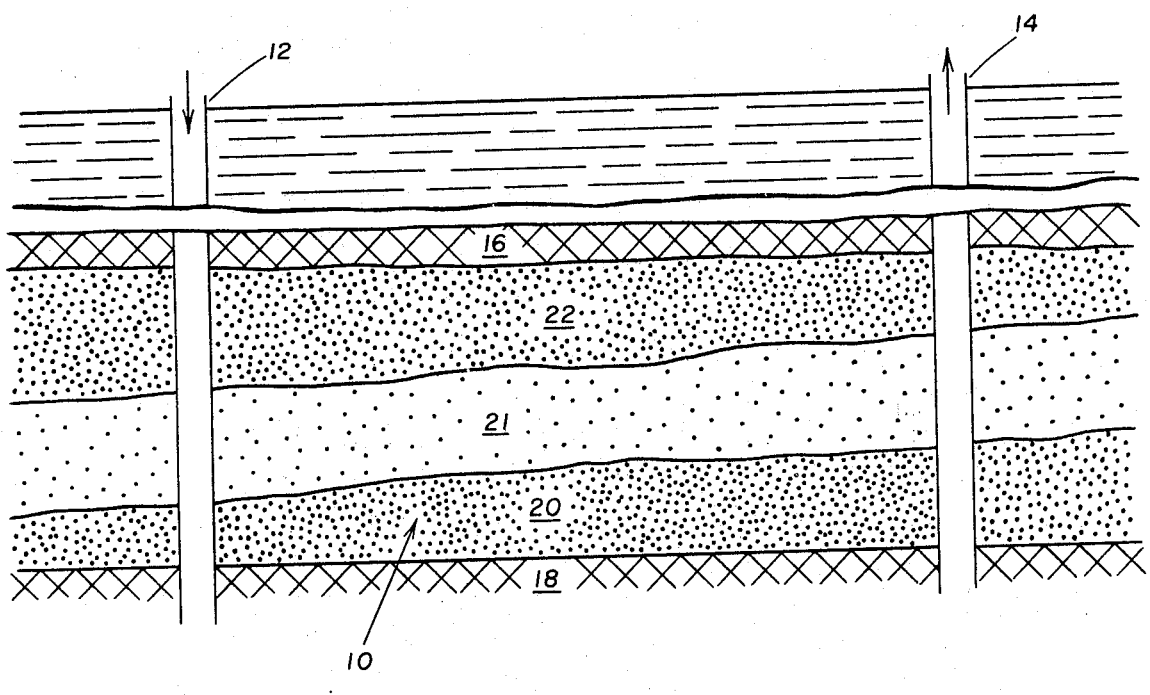
FIGURE 1 is a vertical section of an oil reservoir taken between injection and production wells showing exemplary permeability variations within the reservoir.

Turning now to FIGURE 1, there is illustrated an oil reservoir 10 penetrated by spaced injection and production wells 12 and 14, respectively. While, for the purpose of simplicity in describing the invention, only one injection well and one production well are shown, it will be recognized that in practical applications of the invention a plurality of such wells may be, and in most cases will be, utilized. Thus, the wells 12 and 14 may each be considered to be located in rows of spaced injection and production wells, as in the line flood pattern described above. Also, the injection well 12 may be considered to be the central well in a circular flood pattern, e.g., a five-spot or nine-spot pattern, and the production well 14 one of the peripheral wells.

The reservoir 10 is bounded by layers 16 and 18 of relatively impermeable rock which overlie and underlie the reservoir. The reservoir is shown as being comprised of a plurality of fairly well defined zones 20, 21, and 22 which differ considerably in permeability in the direction of flow from the injection well to the production well. These zones may, of course, slope or have various curvatures, but typically they extend generally parallel to one another as shown. Some of the zones may be discontinuous; that is, they may terminate or begin at various locations as viewed in the direction of flow. Also, while only vertical permeability variation is shown in the reservoir 10, it will be recognized that the reservoir may exhibit horizontal permeability variation. Thus, a horizontal section through the reservoir may reveal zones of diverse permeabilities.

Of the reservoir zones illustrated, those indicated by reference numerals 20 and 22 are considered to be zones of relatively low permeability with the zone 21 being a zone of relatively high permeability. Each of the reservoir zones 20, 21, and 22 contains oil which is desired to be displaced to the production well 14 by injecting a suitable fluid through the injection well 12. It will readily be recognized that upon injecting a displacing fluid through the well 12, the fluid will flow preferentially through the zone 21 of high permeability with the result that relatively rapid displacement occurs therein as compared with the low permeability zones 20 and 22. Thus, the high permeability zone 21 will be "swept out" and the displacing fluid will break through at the production well 14 long before the injected displacing fluid is moved completely through the low permeability zones 20 and 22. Once breakthrough occurs at the production wells, the effectiveness of the secondary recovery process will be seriously restricted and additional oil can be recovered from the relatively low permeability zones 20 and 22 only at an increased expense. The preferential flow of liquid through the high permeability zone 21 may be decreased by the injection of a positive nonsimple liquid as a displacing fluid. The use of the positive nonsimple liquid in this regard will retard premature breakthrough at the production well and thus increase the amount of oil which may be recovered economically from the low permeability zones 20 and 22.

One difficulty encountered with the use of a positive nonsimple liquid, as well as with various other liquids of different viscosities, resides in the tendency of the liquid to crossflow between high and low permeability zones within a reservoir. Thus, with reference to FIGURE 1, for example, the positive nonsimple liquid flowing within the high permeability zone 21 will tend as it flows through the reservoir to cross into low permeability zones 20 and 22. This, of course, decreases the amount of positive nonsimple liquid in the high permeability zone and reduces its effectiveness in preventing premature breakthrough. In accordance with the present invention, this crossflow between high and low permeability zones is restricted by the selective injection of a chelating agent which allows for selective precipitation of a plugging deposit from the positive nonsimple liquid at zones of crossflow between the high and low permeability strata.

More particularly, and with further reference to FIGURE 1, an aqueous liquid containing a chelating agent for divalent metal ions within the reservoir 10 is injected through well 12. In addition, a positive nonsimple liquid which contains a material which is reactive with such divalent metal ions to form a plugging precipitate within the reservoir is injected through well 12. This reactive material may be the active agent utilized in forming the positive nonsimple liquid since many of these agents precipitate readily in the presence of divalent metal ions. Preferably, the chelating agent and positive nonsimple liquid are injected in successive steps, although if desired the chelating agent may be included within the initial portion of the positive nonsimple liquid.

Subsequent to the injection of the positive nonsimple liquid, an aqueous liquid containing a chelating agent for the divalent metal ions is again injected through well 12 followed by a suitable driving fluid such as water, gas, or alternate slugs of water and gas. As the positive nonsimple liquid is displaced through the reservoir in the direction of the production well 12, the reactive material will tend to precipitate at the interfaces between zones 20, 21, and 22. This precipitate will form a barrier which will restrict fluid flow and tend to keep the positive nonsimple liquid within high permeability zone 21 where it exhibits its greatest effectiveness. The subsequently injected solution of chelating agent will tend to solubilize the precipitate, thus in effect moving the barrier through the reservoir concomitantly with the flow of the positive nonsimple liquid.

Figure 2:
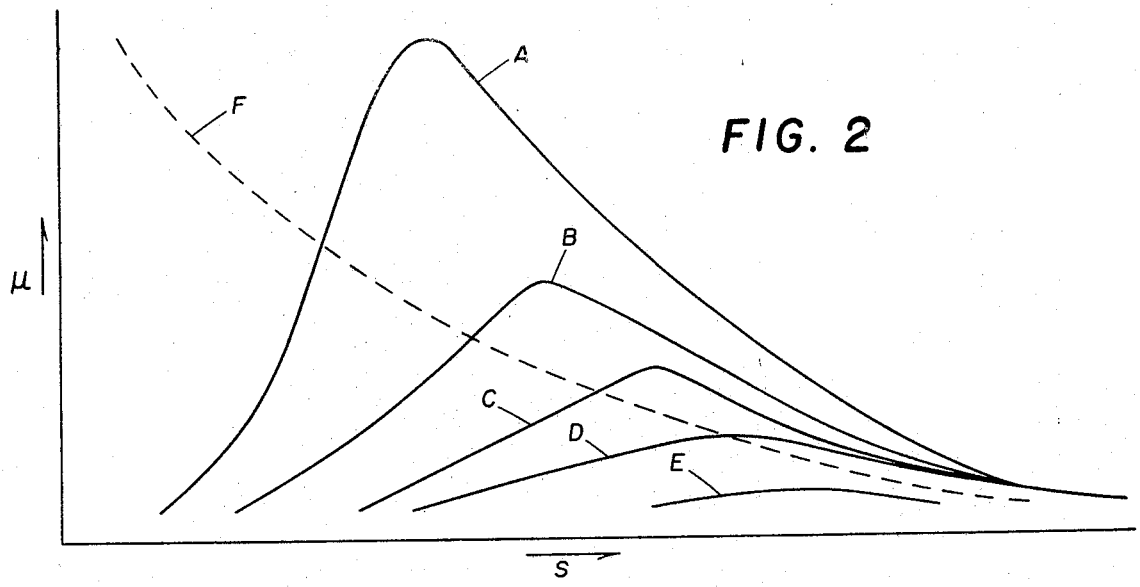
FIGURE 2 is a graph illustrating the viscosity response of a positive nonsimple liquid in zones of different permeabilities as a function of shear rate within such zones.

Turning now to FIGURE 2, there is illustrated the changes in viscosity of a positive nonsimple liquid in strata of dissimilar permeabilities at different shear rates. In FIGURE 2, the viscosity $\mu$ of the positive nonsimple liquid is plotted on the ordinate and the log of the shear rate S is plotted on the abscissa. The curves A, B, C, D, and E represent, respectively, shear rate-viscosity plots for strata of decreasing permeability. Thus, curve A illustrates the shear rate-viscosity relationship for the positive nonsimple liquid in the strata of greatest permeability, and curve E shows this same relationship in the strata of lowest permeability.

The positive nonsimple liquid illustrated in FIGURE 2 exhibits shear-thinning and shear-thickening characteristics represented by the portions of the curves A through E to the right and left, respectively, of the viscosity maxima of these curves. By the term "shear thinning" is meant that characteristic whereby a liquid exhibits a decrease in viscosity with an increase in shear rate. The term "shear thickening", on the other hand, is defined as that characteristic whereby a liquid exhibits an increase in viscosity with an increase in shear rate. Due to the radial flow geometry attendant to the injection of fluids from a well into a subterranean formation, extremely high pressure gradients and shear rates occur in those portions of the formation immediately adjacent the injection well. Thus, near the injection well the positive nonsimple fluid illustrated in FIGURE 2 will be shear thinning. However, the shear rate decreases rapidly as the injected fluid moves away from the injection well such that it will act predominantly as a shear thickener. Stated otherwise, the fluid illustrated in FIG. 2 will act as a shear thickener throughout a greater extent of the formation than it will act as a shear thinner. Thus, a liquid such as that illustrated by FIGURE 2 which exhibits predominantly shear-thickening characteristics during radial flow through a formation is termed a "shear-thickening" liquid. Insofar as is presently known, positive nonsimple liquids are also non-Newtonian and exhibit regions of shear thickening and shear thinning as illustrated in FIGURE 2.

Non-Newtonian liquids in which shear thickening is either not present, or is present at low shear rates which occur if at all only in a minor portion of a formation during the course of radial flow, are commonly termed "shear-thinning" liquids. The shear rate-viscosity relationship for a shear-thinning liquid is illustrated by curve F in FIGURE 2. A shear-thinning liquid typically will exhibit an increase in viscosity with decreasing shear rate down to shear rates of 1.0 second$^{-1}$ and less as far as is presently known. For a more detailed description of the phenomena of positive nonsimplicity, shear thinning and shear thickening, reference is made to the aforementioned Patent No. 3,391,736 to Abdo.

Turning now to FIGURES 3A, 3B, 3C, and 3D, there is shown an idealized reservoir model illustrating the sequential locations and flow paths of the various liquids injected in accordance with the present invention. Fluid movement through the model is shown as being from left to right. The reservoir model is depicted as having a high permeability zone 28 and a low permeability zone 29. By way of example, the zones 28 and 29 may be considered as corresponding generally to the zones 21 and 20, respectively, shown in FIGURE 1.

Figure 3A:
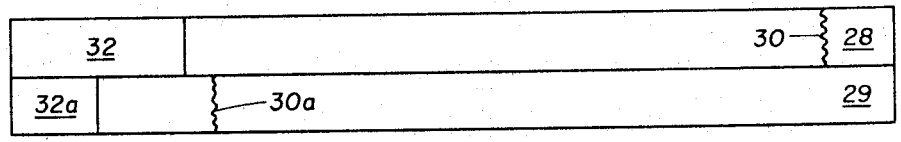
FIGURES 3A, 3B, 3C, and 3D are diagrammatic illustrations showing the progressive flow of injected fluids through adjacent reservoir zones of dissimilar permeabilities.

In the situation depicted in FIGURE 3A, the chelating agent and the positive nonsimple liquid have been injected into the reservoir in successive steps, with the chelating agent being injected in an aqueous Newtonian liquid. The zones 28 and 29 will take the Newtonian liquid containing the chelating agent in amounts generally proportional to their permeability such that the greater amount of chelating agent will be contained in the high permeability zone 28. Thus, the effectiveness of the chelating agent will extend a further distance from the injection well within high permeability zone 28 than within low permeability zone 29. The effective limit of the chelating agent within zones 28 and 29 is indicated by lines 30 and 30a, respectively, and the slugs of liquid containing the chelating agent are not separately shown. The slugs of positive nonsimple liquid in zones 28 and 29 are indicated by reference characters 32 and 32a, respectively. The ratio of injectivity into zone 28 to the injectivity into zone 29 will be significantly less than the ratio of the permeability of zone 28 to the permeability of zone 29, with the result that the disparity in slug sizes of the positive nonsimple liquid will be less than would be the case with a Newtonian liquid.

Figure 3B:
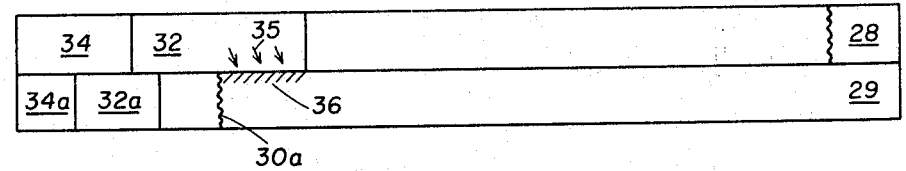

After injection of the positive nonsimple liquid, a chelating agent is again injected into the reservoir in order to obtain the distribution shown in FIGURE 3B. The slugs of liquid containing this chelating agent are indicated in FIGURE 3B by reference characters 34 and 34a in zones 28 and 29, respectively. As indicated previously, the positive nonsimple liquid may tend to undergo crossflow from the high permeability zone to the low permeability zone at various locations as it flows through the reservoir. This situation is depicted in FIGURE 3B by arrows 35. As such crossflow takes place beyond the effective limit of the chelating agent within zone 29, the active agent or other reactive material will precipitate upon contact with the divalent metal ions within the low permeability zone 29. As this occurs, the resultant precipitate will tend to form a plugging deposit, illustrated as shaded area 36, which acts as a flow-restricting barrier along the interface between zones 28 and 29. This will prevent or retard fluid flow between the zones and thus tend to retain the positive nonsimple liquid within the high permeability zone 28. The subsequently injected chelating agent may be injected in any suitable aqueous liquid such as a positive nonsimple liquid or a Newtonian liquid. It usually will be desirable for purposes of economy to inject the chelating agent indicated by slugs 34 and 34a in a Newtonian liquid.

Figure 3C:
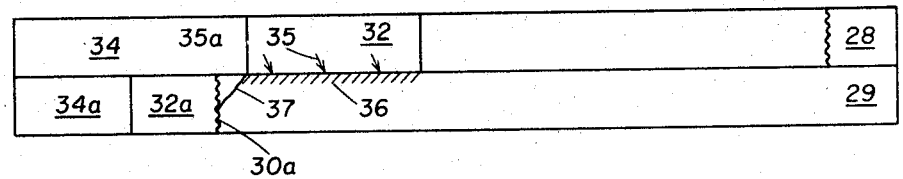

FIGURE 3C illustrates the effect of the second injected slug of chelating agent in solubilizing the previously precipitated plugging deposit and also in preventing precipitation of plugging deposit within the low permeability zone 29. As illustrated in FIGURE 3C as the slug 34 advances through the formation, it contacts the barrier 36 and tends to dissolve the plugging deposit at this point. The effect of this as illustrated in FIGURE 3C is to move the barrier through the formation concomitantly with the flow of positive nonsimple liquid in bank 32. In addition, crossflow from the high permeability zone 28 to the low permeability zone 29 behind the barrier 36 will tend to cause chelating agent to flow into the low permeability zone as indicated by arrow 35a. This will increase the amount of chelating agent within the low permeability zone 29 and extend the effect thereof beyond line 30a to a new location indicated by line 37. It is highly desirable that this crossflow of chelating agent into the low permeability zone take place before the slug 32a of positive nonsimple liquid advance beyond the limit of effectiveness of the initially injected chelating agent. This will prevent the precipitation of plugging deposit within zone 29 immediately in front of line 30a. However, if plugging deposit is formed at this location, the slug 34 will ultimately advance beyond it, thus allowing crossflow to take place into the low permeability zone 29.

Figure 3D:
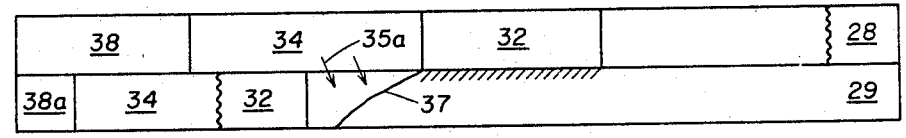

After the second chelating agent injection step, a suitable driving fluid is injected into the reservoir to form banks 38 and 38a, as indicated in FIGURE 3D. The driving fluid may take any suitable form although normally it will be an aqueous flooding medium as in conventional waterflooding. If desired, the driving fluid may contain some chelating agent if it is an aqueous medium. Injection of the driving fluid is continued to advance the previously injected fluids through the reservoir until the process is carried out to completion. As indicated in FIGURE 3D, the barrier 36 at the interface between zones 28 and 29 continues to advance through the reservoir concomitantly with the positive nonsimple liquid 32, and the chelating agent contained in slug 34 will undergo crossflow into the low permeability zone 29 to add additional chelating agent to this zone.

As stated previously, it is desirable to inject the initial slug of chelating agent in an aqueous solution of a Newtonian or a shear-thinning liquid. It is preferred to utilize a shear-thinning liquid in this step of the invention in order to increase the relative amount of chelating agent within zone 28 and thus increase the effective limit of the chelating agent in zone 28 relative to the effective limit in zone 29. In this regard, the ratio of the injectivity of the shear-thinning liquid into zone 28 to the injectivity of this liquid into zone 29 will be greater than the ratio of the permeability of zone 28 to the permeability of zone 29. This, of course, will result in the shear-thinning liquid invading zone 28 in a disproportionately greater amount.

The various liquids utilized in carrying out the present invention may be formed by treating water such as used in conventional waterflooding operations with appropriate additives. Suitable additives which may be utilized to form aqueous shear-thinning liquids are the poly (glucosylglucans) disclosed in U. S. Patent No. 3,372,749 to S. A. Williams, hydroxyethylcellulose such as disclosed in the aforementioned patent to Sandiford, polysaccharide B-1459 produced by the bacterium Xanthomonas campestris, and partially hydrolized and saponified polyacrylamides.

Suitable positive nonsimple liquids which may be utilized in the present invention include aqueous solutions of alkali metal, ammonium, amine, and alkanolamine soaps; copper cetyl phenyl ether sulfonate; and acid salts of hexadecylamine and octadecylamine-adjusted to proper conditions of pH and salinity as described in U. S. Patent No. 3,391,736 to Abdo. Additional additive systems which may be utilized to form positive nonsimple liquids are disclosed in U. S. Patent No. 3,303,879 to Williams, U. S. Patent No. 3,315,744 to Dunlap, and U. S. Patent No. 3,315,743 to Abdo et al. As a general rule, it will be desirable to utilize additives in forming the positive nonsimple liquids which readily precipitate in the presence of the divalent metal ions to form the desired plugging deposits. Thus, an alkali metal soap such as sodium oleate which is readily susceptible to precipitation in the presence of the divalent ions would usually be preferred over an acid salt such as hexadecylamine hydrochloride which, as disclosed in the aforementioned patent to Abdo, does not precipitate from solution as readily.

The chelating agent used in the present invention may be any suitable material which is effective in complexing the divalent metal ions within the reservoir. Suitable chelating agents include the alkali metal polyphosphates such as sodium hexametaphosphate, sodium tetraphosphate, and sodium tripolyphosphate; and the amino polycarboxylic acids and alkali metal salts thereof such as ethylenediaminetetraacetic acid, monoethanolethylenediaminetriacetic acid, diethanolethylenediaminediacetic acid, and triglycollamic acid. The chelating agent selected, particularly for use in the second injection step, should be one in whose presence the precipitate forming reaction is readily reversible. Particularly suitable chelating agents which are readily available are sodium hexametaphosphate sold commercially as "Calgon" and the tetrasodium salt of ethylenediaminetetraacetic acid sold commercially as "Versenate". These materials usually will be preferred from the standpoint of economy, commercial availability, and widespread compatability with reservoir conditions.

The efficacy and compatability of various materials to be used in the invention with respect to another and to specific reservoir systems can be determined by routine laboratory tests. For example, the activity of a particular positive nonsimple liquid in a given reservoir system can be determined by applying the criteria taught in U. S. Patent No. 3,391,736 to specific conditions of reservoir temperature, pH, and salinity involved. Similarly, suitable chelating agents can be selected by tests carried out on samples from the reservoir involved.

In some reservoirs there may not be sufficient divalent metal ions in solution to cause precipitation of the desired volume of plugging deposit. In a further aspect of the invention, the concentration of such ions may be increased by preceding the positive nonsimple liquid with an aqueous solution of an alkali metal salt. Petroleum reservoirs typically contain clays such as illites or montmorillonites which comprise calcium or magnesium oxides. By initially injecting an aqueous solution of an alkali metal salt, typically sodium chloride, an ion exchange reaction may be effected between the alkali metal ions and the divalent metal ions associated with the reservoir clays. Thus, the divalent metal ions are placed in aqueous solution in order to ultimately form the desired plugging deposits within the reservoir. In this embodiment of the invention, it usually will be desired to initially inject the alkali metal salt in a relatively high concentration, e.g. on the order of 4 percent by weight and then gradually reduce the alkali metal salt to concentration of the resident fluids of the reservoir undergoing treatment. The alkali metal salt may be injected in the aqueous slug containing the initial chelating agent or it may be injected in a separate slug preceding the chelating agent. Thereafter, the positive nonsimple liquid, chelating agent and driving fluid may be injected into the reservoir as previously described.

I claim:

1. In the recovery of oil from a subterranean oil reservoir penetrated by spaced injection and production systems defining a recovery zone of said reservoir, the method comprising:
    (a) injecting into said reservoir via said injection system an aqueous liquid containing a chelating agent for divalent metal ions within said reservoir;
    (b) injecting into said reservoir via said injection system a positive nonsimple aqueous liquid containing a material reactive with divalent metal ions to form a plugging deposit within said reservoir;
    (c) subsequent to step (b) injecting into said reservoir via said injection system an aqueous liquid containing a chelating agent for divalent metal ions;
    (d) thereafter injecting a driving fluid into said reservoir via said injection system; and
    (e) recovering oil from said production system.

2. The method of Claim 1 wherein said aqueous liquid containing a chelating agent in step (a) is injected into said reservoir prior to step (b).

3. The method of Claim 2 wherein said aqueous liquid of step (a) is selected from the group consisting of Newtonian and shear-thinning liquids.

4. The method of Claim 3 wherein said aqueous liquid of step (a) is a shear-thinning liquid.

5. The method of Claim 1 further comprising, prior to step (b), injecting into said reservoir via said injection system an aqueous solution of an alkali metal salt whereby ion exchange is effected with divalent metal ions associated with clays within said reservoir to increase the concentration of divalent metal ions in aqueous solution in said reservoir.